(12) United States Patent
De Ruijter

(10) Patent No.: US 12,368,462 B2
(45) Date of Patent: Jul. 22, 2025

(54) APPARATUS AND METHOD FOR REMOVING NOISE FROM FREQUENCY SIGNALS

(71) Applicant: Silicon Laboratories Inc., Austin, TX (US)

(72) Inventor: Hendricus De Ruijter, Roseville, CA (US)

(73) Assignee: Silicon Laboratories Inc., Austin, TX (US)

( * ) Notice: Subject to any disclaimer, the term of this patent is extended or adjusted under 35 U.S.C. 154(b) by 443 days.

(21) Appl. No.: 18/060,117

(22) Filed: Nov. 30, 2022

(65) Prior Publication Data

US 2024/0178870 A1    May 30, 2024

(51) Int. Cl.
*H04B 1/18*    (2006.01)
*H04B 1/04*    (2006.01)

(52) U.S. Cl.
CPC ....... *H04B 1/18* (2013.01); *H04B 2001/0425* (2013.01)

(58) Field of Classification Search
CPC .......................... H04B 1/18; H04B 2001/0425
See application file for complete search history.

(56) References Cited

U.S. PATENT DOCUMENTS 10,172,105 B2    1/2019    De Ruijter et al.

*Primary Examiner* — Nader Bolourchi
(74) *Attorney, Agent, or Firm* — Trop, Pruner & Hu, P.C.

(57) ABSTRACT

In one example, a receiver includes: a front end circuit to convert a radio frequency (RF) input signal into at least one frequency signal; a non-linear circuit coupled to the front end circuit, the non-linear circuit to generate at least one shaped frequency signal from the at least one frequency signal according to at least one non-linear transfer function; and a modulation signal detector coupled to the non-linear circuit to output a likelihood signal based on the at least one shaped frequency signal.

20 Claims, 6 Drawing Sheets

Non-Linear Transfer Function

Input Signal into the Non-Linear Circuit

Output Signal of the Non-Linear Circuit

APPARATUS AND METHOD FOR REMOVING NOISE FROM FREQUENCY SIGNALS

BACKGROUND

In packetized communications, a receiver needs to find the start of payload data within a packet. Symbol boundaries and the start of a first payload symbol need to be found. To this end, transmission usually starts with a preamble followed by a synchronization (sync) word, followed by the payload.

The receiver may use at least the sync word (and optionally the preamble) to find the start of the payload. A common receiver implementation to find the sync word uses a front end circuit for translating a radio frequency (RF) input signal to a lower frequency signal, and a correlator to correlate the received frequency signal with an expected pattern. However when noise or a combination of noise and undesired signals is received, the frequency signal may have large noise peaks. These large noise peaks may lead to frequent false positives, i.e., detecting the presence of a sync word while there was no valid input signal. False positives can be harmful when they are closely followed by a valid sync word. For example, the valid sync word could be seen by the receiver as being part of the payload and the receiver would not be able to find the valid payload and hence the packet is missed. Conventional solutions to false detections increase a detection threshold, but this negatively impacts detection sensitivity.

SUMMARY OF INVENTION

In one aspect, a receiver comprises: a front end circuit to convert a radio frequency (RF) input signal into at least one frequency signal; a non-linear circuit coupled to the front end circuit, the non-linear circuit to generate at least one shaped frequency signal from the at least one frequency signal according to at least one non-linear transfer function; and a modulation signal detector coupled to the non-linear circuit to output a likelihood signal based on the at least one shaped frequency signal.

In an embodiment, the non-linear circuit is to generate the at least one shaped frequency signal according to the at least one non-linear transfer function comprising at least one of a sine approximation function or a cosine approximation function. The non-linear circuit can force a level of the at least one shaped frequency signal towards zero when a level of the at least one frequency signal exceeds a threshold level. The modulation signal detector comprises at least one correlator, which may be a sliding correlator. The at least one correlator is to correlate the at least one shaped frequency signal with one or more of an expected preamble or a sync word pattern to generate the likelihood signal.

In an embodiment, the receiver further comprises a timing detection circuit coupled to the at least one correlator to produce at least one of a timing detection signal or a timing signal based on the likelihood signal. The timing detection circuit is to assert the timing detection signal in response to the likelihood signal exceeding a detection threshold. The receiver further comprises a demodulator coupled to the timing detection circuit, the demodulator to produce a demodulated signal based on the at least one shaped frequency signal and at least one of the timing detection signal or the timing signal.

In an embodiment, the receiver further comprises an estimator to determine a frequency offset estimation signal based on the at least one frequency signal. The front end circuit may include a numerically controlled oscillator, the estimator to provide the frequency offset estimation signal to the numerically controlled oscillator to cause an update to a mixing signal, the mixing signal to be provided to a digital mixer of the front end circuit. The receiver may further comprise a compensation circuit coupled to the estimator, where the compensation circuit is to produce at least one compensated frequency signal based on the frequency offset estimation signal and the at least one frequency signal. The compensation circuit may provide the at least one compensated frequency signal to the non-linear circuit, the non-linear circuit to output the shaped frequency signal based on the at least one compensated frequency signal.

In another aspect, a method comprises: receiving, in a non-linear circuit coupled to a RF front end circuit, a frequency signal corresponding to a RF input signal; shaping, in the non-linear circuit, the frequency signal according to a non-linear transfer function; determining, in a modulation signal detector coupled to the non-linear circuit, a detection likelihood based on the shaped frequency signal and a synchronization pattern; comparing the detection likelihood to a detection threshold to determine at least one of a timing detection signal or a timing signal; and demodulating the shaped frequency signal according to at least one of the timing detection signal or the timing signal.

In an embodiment, the method further comprises: estimating a frequency offset based on the frequency signal; and compensating the frequency signal based on the estimated frequency offset, wherein receiving, in the non-linear circuit, the frequency signal comprises receiving the compensated frequency signal.

The method further comprises: estimating a frequency offset based on the frequency signal; and controlling at least one of a numerically controlled oscillator of the RF front end circuit or a RF frequency synthesizer of the RF front end circuit based at least in part on the estimated frequency offset. The method may also include shaping the frequency signal according to at least one of a sine function or a cosine function.

In another aspect, a system comprises a receiver to receive a RF signal, the receiver comprising: a RF front end circuit to process the RF signal into a frequency signal; an estimator coupled to the RF front end circuit to determine a frequency offset estimation signal based on the frequency signal; a compensation circuit coupled to the estimator to produce a compensated frequency signal based on the frequency offset estimation signal and the frequency signal; a non-linear circuit coupled to the RF front end circuit, the non-linear circuit to generate a shaped frequency signal from the compensated frequency signal according to a non-linear transfer function; a modulation signal detector coupled to the non-linear circuit to output a likelihood signal based on the shaped frequency signal; and a demodulator coupled to the non-linear circuit to demodulate the shaped frequency signal into a demodulated signal based at least in part on the likelihood signal. The system may further include a signal processor coupled to the receiver to process the demodulated signal to obtain message content, and a digital processor coupled to the signal processor to process the message content.

In an example, the non-linear circuit is to generate the shaped frequency signal according to the non-linear transfer function comprising at least one of a sine approximation function or a cosine approximation function. The non-linear circuit may be configured to: when the frequency signal is within a range, output the frequency signal as the shaped frequency signal; when the frequency signal exceeds the range, reduce the frequency signal proportionally to an amount of exceeding the range and output the reduced frequency signal as the shaped frequency signal.

DETAILED DESCRIPTION

Figure 1:
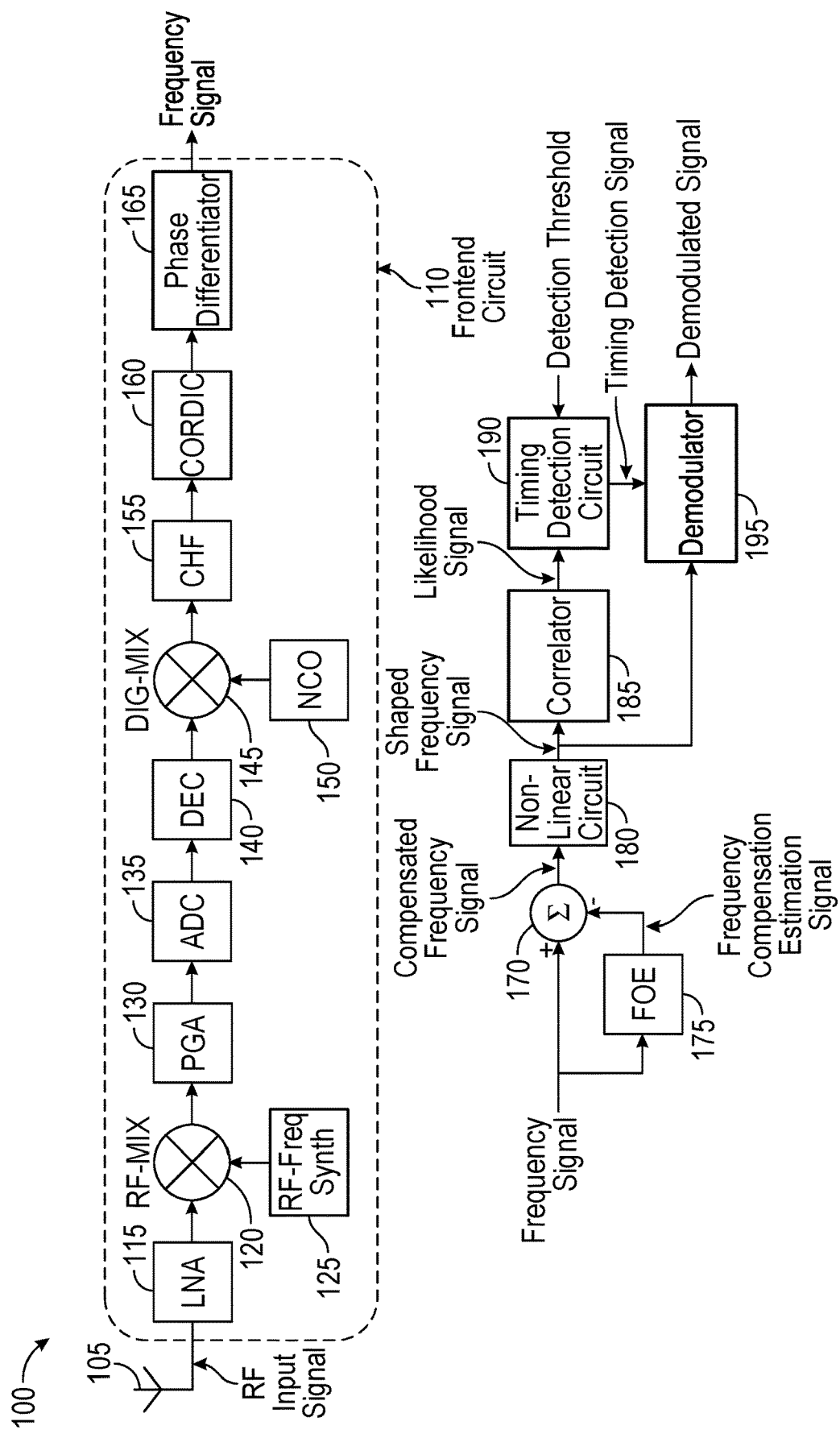
FIG. 1 is a block diagram of a portion of a receiver in accordance with an embodiment.

In various embodiments, a radio receiver is configured to provide improved synchronization. To this end, embodiments may perform additional processing on an incoming signal to reduce noise. In this way, improved sensitivity may be realized as synchronization can be more readily detected. In addition, embodiments may enable a reduction of false detections (such as false positives in which a synchronization pattern is identified in noise).

Embodiments may process an incoming signal using a non-linear function that reduces noise levels. This processing may be performed within a receiver signal processing path prior to an incoming signal being provided to a detector such as a correlator that performs a correlation on the incoming signal. Embodiments may further identify and remove (at least substantially) a frequency offset from the incoming signal prior to the non-linear function processing described herein.

In general, a correlator can be used to detect presence of a modulated signal. To do this, the correlator performs a cross-correlation between the incoming signal and a known pattern such as a preamble of a packet, a synchronization portion of the packet, or a combination of at least a portion of the preamble and at least a portion of the synchronization portion. Of course, other known patterns can be used by a correlator. The correlator operates to determine a cross-correlation value. Based on the cross-correlation value, the correlator may determine a likelihood of signal detection. For example, where the cross-correlation value exceeds a threshold, a likelihood signal may be output to indicate a valid detection of the known pattern, which can be used in determining a start of payload data.

A correlator may generate a relatively high correlation value in the face of noise even when the signal does not include a valid signal. Such high correlator values in noise can be understood from the cross-correlation equation of Equation 1:

$$CC_i = \Sigma_{k=0}^{n} c_k x_{(i+k)}$$ [EQ. 1]

where, $CC_i$ is the correlation value;

$x_{(i+k)}$ are the correlator input samples, such as differentiated phase or frequency domain samples (corresponding to a frequency signal); and $c_k$ are the coefficients of a search pattern.

As shown in EQ. 1, the magnitude of the input samples ($x_{(i+k)}$) can have a direct impact on the correlation value.

Large noise spikes, such as caused by phase clicks and doublets, could dominate the correlation value. For example, just a few noise spikes in the series $x_{(i+k)}$ could boost the correlation value when the associated coefficients ($c_k$) match polarity. In turn, this could cause a false detection when the correlation value is boosted to a level that exceeds a detection threshold. While such false detections can be mitigated by increasing the detection threshold, this comes at the price of degraded detection sensitivity.

In one or more embodiments, the impact of noise on an incoming signal may be reduced, particularly when the noise content causes high magnitude values. To this end, embodiments may process an incoming signal with a non-linear gain circuit having a non-linear transfer function. This non-linear gain circuit may be configured to limit or reduce a noise level at its output when the noise exceeds a certain level.

Referring now to FIG. 1, shown is a block diagram of a portion of a receiver in accordance with an embodiment. As shown in FIG. 1, receiver 100 includes a front end circuit 110 that is configured to convert an RF input signal to a lower frequency signal. In different implementations front end circuit 110 may downconvert the incoming RF signal to a lower frequency signal, such as an intermediate frequency (IF), low IF or zero IF (ZIF) signal.

As shown in FIG. 1, an RF input signal, e.g., from an antenna 105, is passed into front end circuit 110 and is amplified by a Low Noise Amplifier (LNA) 115. After amplification, the RF input signal is provided to a mixer 120, which downconverts the RF signal to a lower frequency, e.g., a given IF signal. To this end, a RF frequency synthesizer 125 is configured to generate a mixing signal at a mixing frequency, such that mixer 120 downconverts the RF input signal to a desired lower frequency signal.

Still with reference to FIG. 1, a Programmable Gain Amplifier (PGA) 130 provides a programmable amount of gain to the IF signal, which is then converted from analog to digital form by an analog-to-digital converter (ADC) 135. The resulting digitized signal may be converted to a lower sample rate by a decimator (DEC) 140. In other implementations, DEC 140 may be optional, or a different type of decimation or other sample rate conversion may occur.

Next, the digital signal is converted to a baseband signal by a digital mixer 145, controlled by a numerically controlled oscillator (NCO) 150. A channel filter 155 is configured to filter the baseband signal to remove adjacent channel interference. In an embodiment, channel filter 155 may be programmable and in a particular implementation may be programmed to have a center frequency of about 500 KHz and a passband of about 1 MHz. The filtered digitized signal is provided to a Coordinate Rotation Digital Computer (CORDIC) engine 160, which is used to transfer the filtered baseband signal from a cartesian representation to a phase representation. A phase differentiator 165 is configured to obtain the frequency signal by differentiating the phase. Understand that in other embodiments, there may be other ways to produce the frequency signal. For example, instead of a CORDIC and differentiator, a frequency discriminator circuit, a pulse duration counter, a Foster-Seeley discriminator, or so forth may be used.

In some implementations, multiple frequency signals can be obtained by having different differentiation intervals. For example, a 1-bit differential frequency signal can be obtained by subtracting a second phase value from a first phase value, where the time difference between the first phase value and second phase value is a 1-bit period. A 2-bit differential frequency signal can be obtained by subtracting a third phase value from the first phase value, where the time difference between the first phase value and the third phase value is 2-bit period, etc.

Still with reference to FIG. 1, note that the frequency signal derived in front end circuit 110 is provided for further processing, generally performed by digital processing circuitry. As shown, the frequency signal may be provided to a frequency offset estimator (FOE) 175 to determine a frequency offset. In one embodiment, FOE 175 may be configured to average the frequency signal over several bit periods to average out noise and modulation. In turn, a summer circuit 170 may be configured to remove the determined frequency offset provided by FOE 175. More specifically as shown, the estimated frequency offset is subtracted from the frequency signal to obtain a compensated frequency signal.

As further shown in FIG. 1, a non-linear circuit 180 is configured to further process this compensated frequency signal by applying the signal to a non-linear function, to lower noise content in the compensated frequency signal and output a shaped frequency signal. Note that in a particular embodiment, non-linear circuit 180 may be implemented as a non-linear gain circuit that does not use delay cells and does not need memory. In some implementations, non-linear circuit 180 may be configured to apply the non-linearity with simple saturation, and may be implemented using register transfer logic (RTL) logic.

Non-linear circuit 180 may be bypassed in case there is frequency offset at the input of the sine-shaper, e.g., when the frequency offset is estimated as part of a detector/correlator. In such embodiment a memory can be used to replay the same set of samples (as used for the frequency offset estimation) and compensate for the frequency offset before the samples are processed by non-linear circuit 180.

Still referring to FIG. 1, the non-linear output from non-linear circuit 180, namely the shaped frequency signal, is provided both to a demodulator 195 and a correlator 185. Correlator 185 is configured to perform a cross-correlation and output a likelihood signal based on a correlation peak, which indicates a confidence level of signal detection. In an embodiment, this likelihood signal can be a "soft" value, e.g., a 6-bit value (either signed or absolute, depending on implementation).

In one embodiment, correlator 185 may be implemented as a sliding correlator. For a given wireless protocol, a preamble usually is formed of several repeating modulated preamble patterns. For example, in a Wi-SUN implementation, a frequency shift keying (FSK) PHY may use an FSK modulated preamble pattern of "01", repeated 32 times. For a Zigbee implementation, an orthogonal quadrature phase shift keying (O-QPSK) PHY may use a modulated preamble pattern of 32 chips, repeated 8 times.

Correlator 185 may be configured to use such preamble patterns to find timing, e.g., symbol boundaries, so that symbols in the packet can be demodulated. In one or more embodiments, correlator 185 may operate at an oversampling rate (OSR), which means that multiple samples per symbol are used. In this way, it is possible to correlate multiple phases of the received signal with the expected preamble sequence. By considering multiple phases, the receiver may be able to select a phase that is closest to the received symbol boundary, i.e., to detect timing.

For low signal levels, the signal-to-noise ratio (SNR) may be insufficient to correctly detect timing. Detection performance can be improved by increasing correlator length. To this end, the correlator length typically spans several modulated preamble patterns, and may stretch between 8 and 64 chips or symbols.

In one embodiment of a correlator or other detector implementation, a given circuit arrangement is copied for every detection phase. Without an embodiment, noise spikes that propagate through a delay chain in the correlator are summed, causing elevated noise at the correlator output. With this arrangement, a detection threshold is typically set high enough so that a false detection rate is reduced to an acceptable level.

With embodiments that provide a shaped frequency signal to the correlator, the level of the noise spikes can be reduced. This allows for a reduced detection threshold level with a desired false detection rate. In one example implementation, a detector threshold (provided to a timing detection circuit 190) can be reduced by as much as 25%, which may improve detection sensitivity by about 1 dB. Timing detection could be issued when the likelihood signal exceeds the detection threshold. To get closer to symbol boundaries, timing detection circuit 190 could search for a maximum in the likelihood signal, including a few additional likelihood signal samples after the timing detection signal is issued. In some embodiments, the exact detection threshold level can be obtained by reducing it until the false detection rate hits a still acceptable value. For example this value may be less than approximately 10 false detects per 1,000,000 correlation windows. This duration can be measured by counting timing detections while receiving noise for a duration of 1,000,000 correlation windows.

Based on the likelihood signal, timing detection circuit 190 is configured to identify a timing of the received signal. Specifically, timing detection circuit 190 may output a timing detection signal that is asserted when the likelihood signal exceeds a detection threshold. In turn, demodulator 195 may demodulate the shaped frequency signal to obtain a demodulated signal containing message content based on the timing detection signal. Timing detection circuit 190 may also provide a timing signal (not shown) that indicates the time, or sample instant, of the timing signal being asserted, or the likelihood signal maximum value. This timing signal can be consumed by demodulator 195 to use samples that correspond to optimal detection sensitivity. Demodulator 195 could also use the timing signal to retrieve specific samples from memory (not shown) to demodulate the frequency signal from before the timing detection signal was asserted. This could be used to demodulate to the synchronization pattern, as used by correlator 185, and check for correctness so that false detections in timing detection circuit 190 can be detected. In case a false detection is detected, demodulation can be aborted and correlator 185 and timing detection circuit 190 can continue searching for a valid signal.

Although shown at this high level in FIG. 1, many variations and alternatives are possible. For example, instead of a correlator, another type of modulation signal detector may be present. As an example, in a different implementation, instead of a correlator, a cost function engine (CFE) may be present to detect a valid signal within the shaped frequency signal. One example CFE that may be used is disclosed in U.S. Pat. No. 10,172,105, the disclosure of which is hereby incorporated by reference. Note also that while a correlator may search for a correlation peak, a CFE may search for a cost dip.

Figure 2:
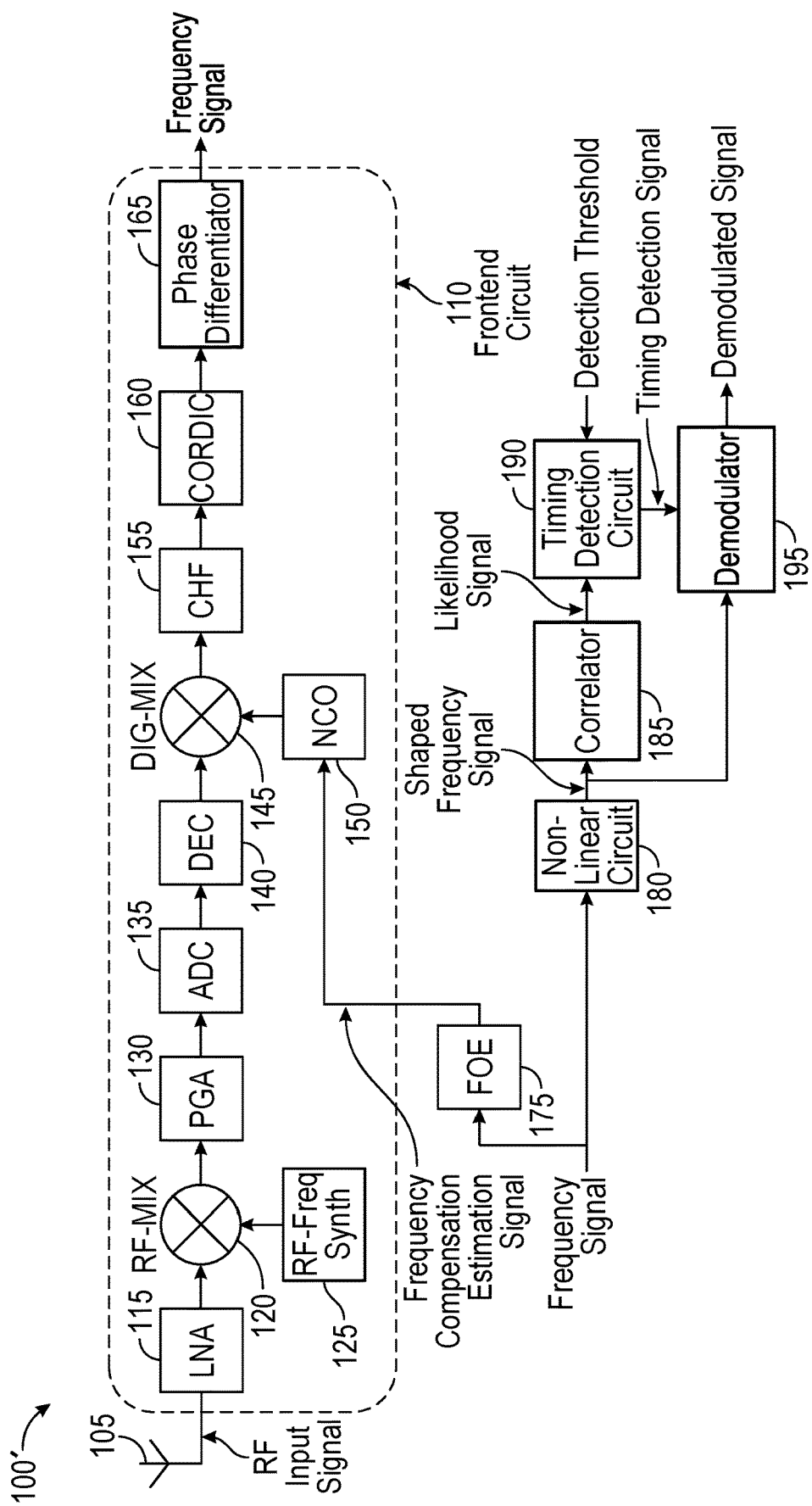
FIG. 2 is a block diagram of a portion of a receiver in accordance with another embodiment

In yet other implementations, a different coupling of frequency offset estimations may occur in other embodiments. Referring now to FIG. 2, shown is a block diagram of a portion of a receiver in accordance with another embodiment. As shown in FIG. 2, receiver 100' may, in many aspects, be configured the same as receiver 100 of FIG. 1 (and thus the same numbering scheme is used). In FIG. 2 however, compensation for a frequency offset determination occurs within front end circuit 110. More specifically as shown in FIG. 2, in this implementation FOE 175 determines a frequency offset and generates a frequency compensation estimation signal that it provides to NCO 150, rather than providing this value to non-linear circuit 180 via summer circuit 170 as in FIG. 1.

With this arrangement, there may be an advantage in that the lower frequency signal, at the input of channel filter 155 can now be centered with respect to the channel filter center frequency. In the embodiment shown in FIG. 1, a frequency offset is not compensated at the input of channel filter 155 and hence channel filter 155 may filter part of the desired signal, which will have a deteriorating effect on the receive performance. However a tradeoff in the embodiment of FIG. 2 is that the frequency offset compensation is delayed by the propagation time incurred by the loop formed by channel filter 155, CORDIC engine 160, phase differentiator 165, FOE 175 and digital mixer 145. In other aspects, receiver 100' is configured and operates the same as receiver 100 of FIG. 1.

Note that in yet other implementations, a frequency offset estimation can be provided to other portions of a signal processing path. For example, while not shown in FIG. 1 or 2, in another embodiment FOE 175 may provide a frequency offset estimate to frequency synthesizer 125. In some embodiments, configurable control of a destination of the frequency offset estimate can be realized. In one implementation, a multiplexer or other selection circuit may be coupled to an output of FOE 175. In turn the multiplexer can be programmably controlled to provide the frequency offset estimate to a given destination. Such control may be based on configuration settings of the receiver, e.g., as determined by a designer of a system including the receiver.

Figure 3A:
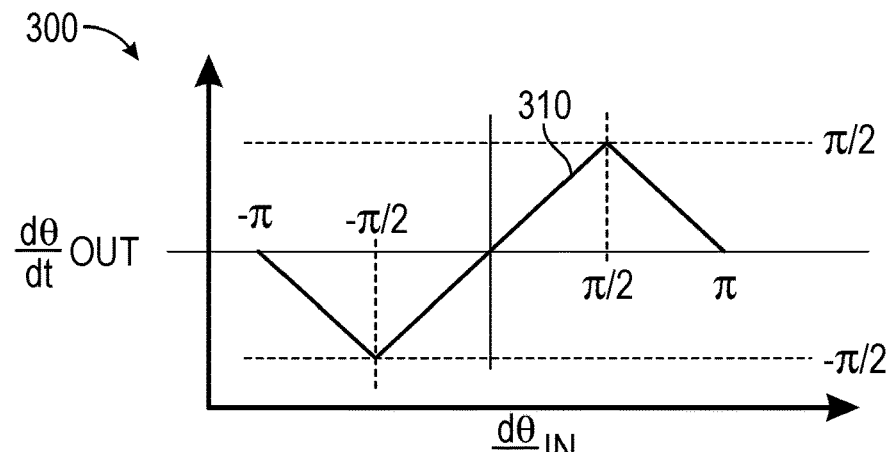
FIGS. 3A-3C are graphical illustrations of non-linear circuit operation in accordance with an embodiment.

Referring now to FIG. 3A, shown is a graphical illustration of a non-linear transfer function in accordance with one embodiment. As shown in illustration 300, transfer function 310 is non-linear in that as an input signal phase changes over a range of $-\pi/2$ to $\pi/2$, an output shows a linear relationship relative to an input, however, when an input amplitude exceeds $-\pi/2$ or $\pi/2$ the output is reduced proportionally. Note that while function 310 does include linear portions, over the full range of phase change of $-\pi$ to $\pi$, a non-linear function is realized. Of course while shown with this particular transfer function for purposes of illustration, other non-linear functions may be used in other implementations.

Figure 3B:
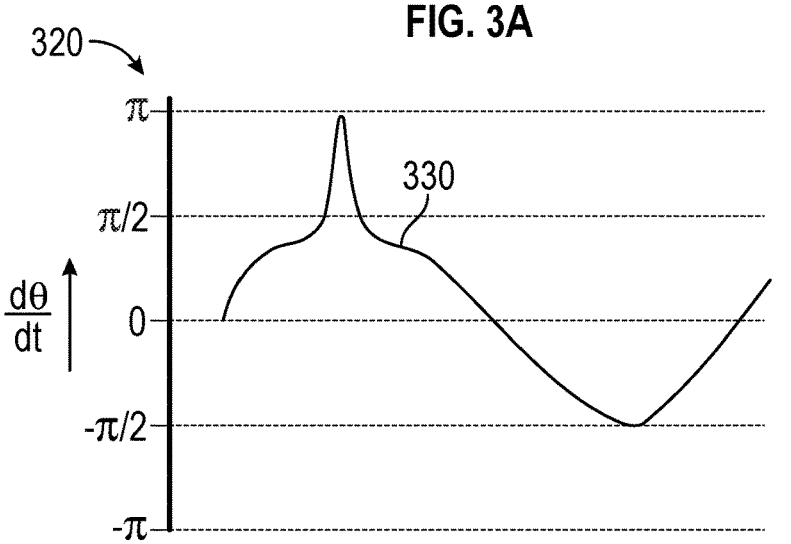
Figure 3C:
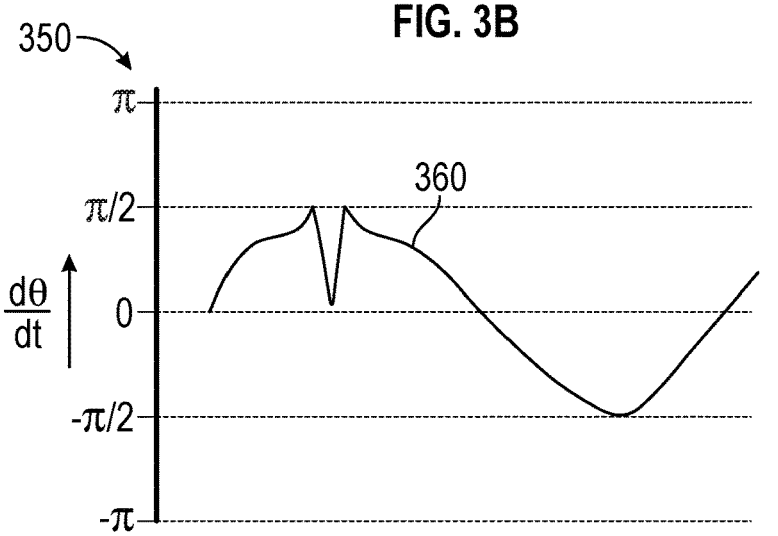

Referring now to FIG. 3B, shown is a graphical illustration 320 of an input signal 330 (i.e., a frequency signal as may be output from a front end circuit) to be provided to a non-linear circuit. This input signal includes noise in the form of a phase click. FIG. 3C shows a graphical illustration 350 of an output signal 360 at an output of the non-linear circuit. As shown, in output signal 360 the phase click has been suppressed. Of course other compensation patterns to minimize high magnitude values may occur in other embodiments. Thus with a configuration of a non-linear circuit, embodiments may reduce the impact of noise on a frequency signal, by limiting or reducing a noise level when this noise level exceeds a certain level.

Referring now to Table 1, shown is example pseudo code of a non-linear circuit operation in accordance with an embodiment. In Table 1, a non-linear function is shown as a sine approximation function, which may be implemented in register transfer level (RTL) logic.

TABLE 1

| |
|---|
| IF (IN ≥ $-\pi/2$ and IN ≤ $\pi/2$) THEN |
|   OUT = IN |
| ELSE (IN > $\pi/2$) THEN |
|   OUT = $\pi$ − IN |
| ELSE (IN < $-\pi/2$) THEN |
|   OUT = $-\pi$ − IN |
| ENDIF |

In the pseudocode of Table 1, "IN" is an input (e.g., frequency) signal and "OUT" is an output signal of the non-linear circuit (here implemented as an approximation of a sine shaper). In another embodiment, a shaper may be configured as a saturation function where the amplitudes at the output of the non-linear function are limited between $-\pi/2$ and $\pi/2$.

Figure 4:
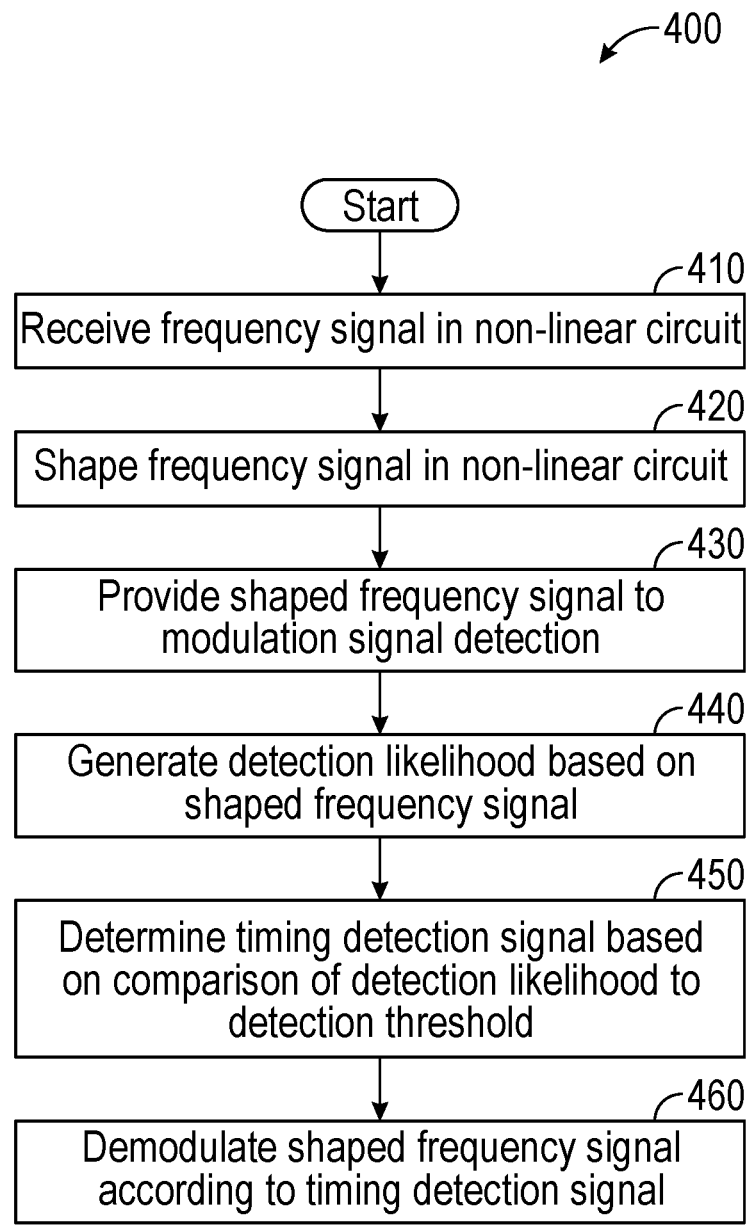
FIG. 4 is a flow diagram of a method in accordance with an embodiment.

Referring now to FIG. 4, shown is a flow diagram of a method in accordance with an embodiment. As shown in FIG. 4, method 400 is a method for performing signal detection in a receiver. As such, method 400 may be performed by hardware circuitry of a receiver that includes a non-linear circuit in accordance with an embodiment. Method 400 may be performed at least in part using receiver hardware circuitry, including signal processing circuitry. In some cases, method 400 may further be performed using firmware and/or software that executes on such signal processing circuitry.

As shown method 400 begins by receiving, in a non-linear circuit coupled to a RF front end circuit, a frequency signal (block 410). This frequency signal may be a differentiated phase signal or a phase signal as output by a RF front end circuit from its processing of an RF input signal. Next at block 420, the frequency signal (corresponding to the RF input signal) is shaped in the non-linear circuit. In one or more embodiments, the non-linear circuit may shape the frequency signal according to a non-linear transfer function (e.g., a sine and/or cosine shaping or saturation function (or a combination thereof)).

Still referring to FIG. 4, next at block 430 the shaped frequency signal is provided to a detector coupled to the non-linear circuit, which generates a detection likelihood based on the shaped frequency signal and a synchronization pattern (block 440). As discussed above, this detector may be implemented in one embodiment as a correlator that performs a correlation between the frequency signal and the synchronization pattern, which may be at least part of a preamble or synchronization portion of a packet (or a combination thereof) to generate a correlation result that acts as an indication of likelihood of packet detection.

Then at block 450, this detection likelihood (e.g., a likelihood signal) may be processed (e.g., in a timing detection circuit) to determine a timing detection signal using a detection threshold. In an embodiment, the likelihood signal could be compared to the detection threshold and the timing detection signal is asserted when the likelihood signal exceeds the detection threshold. Note that this detection threshold may be set to a relatively low level in embodiments, improving receiver sensitivity. In another embodiment, several additional samples, after the detection threshold is exceeded, are processed to find the sample with a maximum likelihood value. This can improve the timing precision of finding symbol boundaries, which in turn may help to improve demodulation sensitivity. Finally at block 460 the shaped frequency signal is demodulated according to the timing detection signal to result in a demodulated signal, which may be further processed in signal processing circuitry. Understand that this processed information, e.g., in the form of message content, can be provided to a digital processor (e.g., of an IoT device), which may perform an operation or cause some action to be taken based on the message content. Understand while shown at this high level in FIG. 4, many variations and alternatives are possible.

Figure 5:
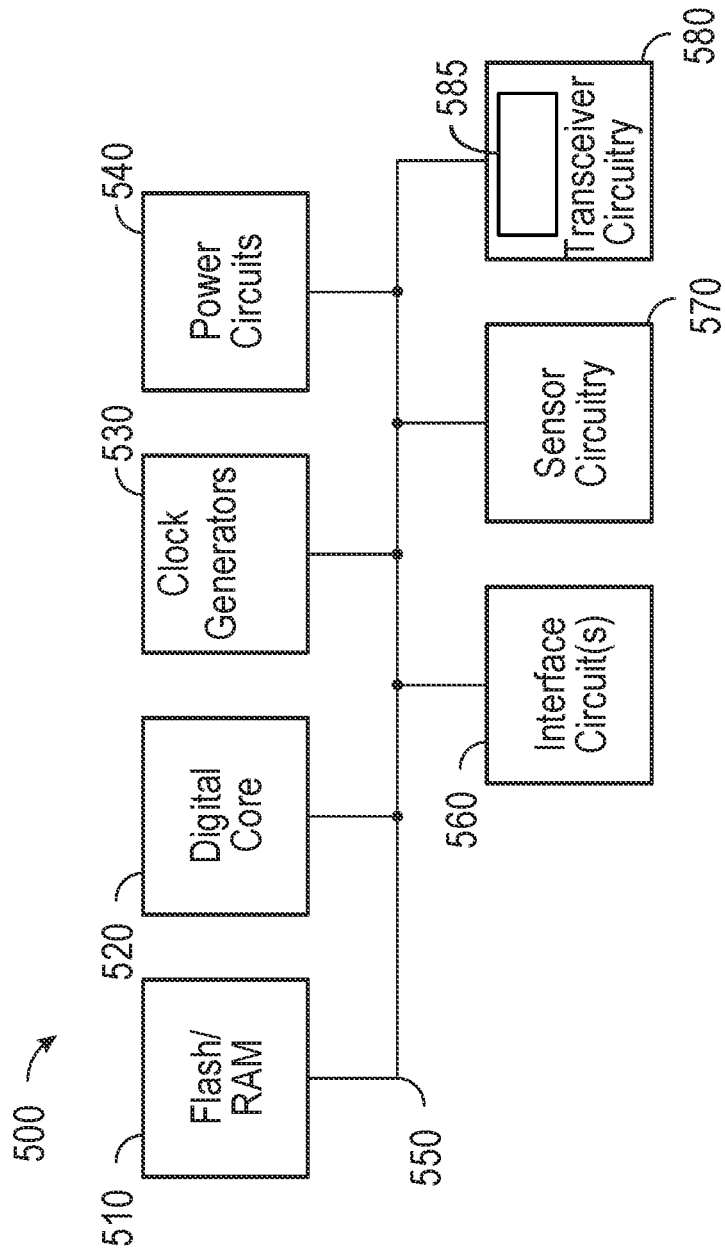
FIG. 5 is a block diagram of a representative integrated circuit in accordance with an embodiment.

Embodiments can be implemented in many different environments. Referring now to FIG. 5, shown is a block diagram of a representative integrated circuit 500 that can be configured to reduce noise levels in incoming signals as described herein. In the embodiment shown in FIG. 5, integrated circuit 500 may be, e.g., a microcontroller having a wireless transceiver that may operate according to one or more wireless protocols (e.g., WLAN-OFDM, WLAN-DSSS, Bluetooth, among others), or other device that can be used in a variety of use cases, including sensing, metering, monitoring, embedded applications, communications, applications and so forth, and which may be particularly adapted for use in an IoT device.

In the embodiment shown, integrated circuit 500 includes a memory system 510 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions, including instructions for processing an incoming signal to reduce noise using a non-linear function in accordance with an embodiment.

Memory system 510 couples via a bus 550 to a digital core 520, which may include one or more cores and/or microcontrollers that act as a main processing unit of the integrated circuit. In turn, digital core 520 may couple to clock generators 530 which may provide one or more phase locked loops or other clock generator circuitry to generate various clocks for use by circuitry of the IC.

As further illustrated, IC 500 further includes power circuitry 540, which may include one or more voltage regulators. Additional circuitry may optionally be present depending on particular implementation to provide various functionality and interaction with external devices. Such circuitry may include interface circuitry 560 which may provide interface with various off-chip devices, sensor circuitry 570 which may include various on-chip sensors including digital and analog sensors to sense desired signals, such as for a metering application or so forth.

In addition as shown in FIG. 5, transceiver circuitry 580 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. As shown, transceiver circuitry 580 includes non-linear circuitry 585 that may reduce noise as described herein. Understand while shown with this high level view, many variations and alternatives are possible.

Note that ICs such as described herein may be implemented in a variety of different devices such as an IoT device. This IoT device may be, as two examples, a smart bulb of a home or industrial automation network or a smart utility meter for use in a smart utility network, e.g., a mesh network in which communication is according to an IEEE 802.15.4 specification or other such wireless protocol.

Figure 6:
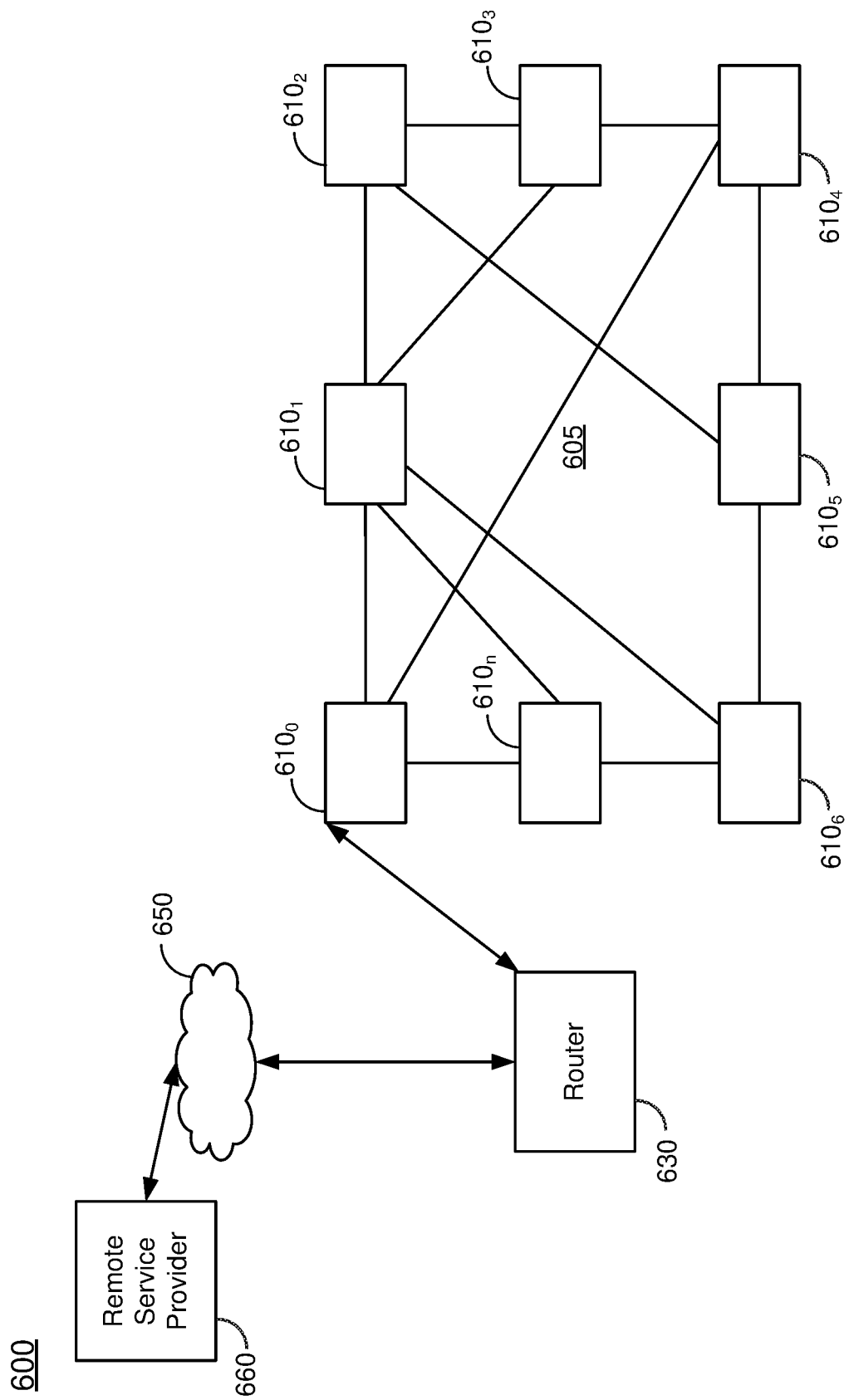
FIG. 6 is a block diagram of a system in accordance with an embodiment.

Referring now to FIG. 6, shown is a high level diagram of a network in accordance with an embodiment. As shown in FIG. 6, a network 600 includes a variety of devices, including smart devices such as IoT devices, routers and remote service providers. In the embodiment of FIG. 6, a mesh network 605 may be present, e.g., in a building having multiple IoT devices 6100-n. Such IoT devices may include transceivers having non-linear circuitry as described herein. As shown, at least one IoT device 610 couples to a router 630 that in turn communicates with a remote service provider 660 via a wide area network 650, e.g., the internet. In an embodiment, remote service provider 660 may be a backend server of a utility that handles communication with IoT devices 610. Understand while shown at this high level in the embodiment of FIG. 6, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A receiver comprising:
   a front end circuit to convert a radio frequency (RF) input signal into at least one frequency signal;
   a non-linear circuit coupled to the front end circuit, the non-linear circuit to generate at least one shaped frequency signal from the at least one frequency signal according to at least one non-linear transfer function; and
   a modulation signal detector coupled to the non-linear circuit to output a likelihood signal based on the at least one shaped frequency signal.

2. The receiver of claim 1, wherein the non-linear circuit is to generate the at least one shaped frequency signal according to the at least one non-linear transfer function comprising at least one of a sine approximation function or a cosine approximation function.

3. The receiver of claim 2, wherein the non-linear circuit is to force a level of the at least one shaped frequency signal towards zero when a level of the at least one frequency signal exceeds a threshold level.

4. The receiver of claim 1, wherein the modulation signal detector comprises at least one correlator.

5. The receiver of claim 4, wherein the at least one correlator comprises a sliding correlator.

6. The receiver of claim 4, wherein the at least one correlator is to correlate the at least one shaped frequency signal with one or more of an expected preamble or a sync word pattern to generate the likelihood signal.

7. The receiver of claim 6, further comprising a timing detection circuit coupled to the at least one correlator to produce at least one of a timing detection signal or a timing signal based on the likelihood signal.

8. The receiver of claim 7, wherein the timing detection circuit is to assert the timing detection signal in response to the likelihood signal exceeding a detection threshold.

9. The receiver of claim 8, further comprising a demodulator coupled to the timing detection circuit, the demodulator to produce a demodulated signal based on the at least one shaped frequency signal and at least one of the timing detection signal or the timing signal.

10. The receiver of claim 1, further comprising an estimator to determine a frequency offset estimation signal based on the at least one frequency signal.

11. The receiver of claim 10, wherein the front end circuit comprises a numerically controlled oscillator, the estimator to provide the frequency offset estimation signal to the numerically controlled oscillator to cause an update to a mixing signal, the mixing signal to be provided to a digital mixer of the front end circuit.

12. The receiver of claim 10, further comprising a compensation circuit coupled to the estimator, wherein the compensation circuit is to produce at least one compensated frequency signal based on the frequency offset estimation signal and the at least one frequency signal.

13. The receiver of claim 12, wherein the compensation circuit to provide the at least one compensated frequency signal to the non-linear circuit, the non-linear circuit to output the shaped frequency signal based on the at least one compensated frequency signal.

14. A method comprising:
receiving, in a non-linear circuit coupled to a radio frequency (RF) front end circuit, a frequency signal corresponding to a RF input signal;
shaping, in the non-linear circuit, the frequency signal according to a non-linear transfer function;
determining, in a modulation signal detector coupled to the non-linear circuit, a detection likelihood based on the shaped frequency signal and a synchronization pattern;
comparing the detection likelihood to a detection threshold to determine at least one of a timing detection signal or a timing signal; and
demodulating the shaped frequency signal according to at least one of the timing detection signal or the timing signal.

15. The method of claim 14, further comprising:
estimating a frequency offset based on the frequency signal; and
compensating the frequency signal based on the estimated frequency offset, wherein receiving, in the non-linear circuit, the frequency signal comprises receiving the compensated frequency signal.

16. The method of claim 14, further comprising:
estimating a frequency offset based on the frequency signal; and
controlling at least one of a numerically controlled oscillator of the RF front end circuit or a RF frequency synthesizer of the RF front end circuit based at least in part on the estimated frequency offset.

17. The method of claim 14, further comprising shaping the frequency signal according to at least one of a sine function or a cosine function.

18. A system comprising:
a receiver to receive a radio frequency (RF) signal, the receiver comprising:
a RF front end circuit to process the RF signal into a frequency signal;
an estimator coupled to the RF front end circuit to determine a frequency offset estimation signal based on the frequency signal;
a compensation circuit coupled to the estimator to produce a compensated frequency signal based on the frequency offset estimation signal and the frequency signal;
a non-linear circuit coupled to the RF front end circuit, the non-linear circuit to generate a shaped frequency signal from the compensated frequency signal according to a non-linear transfer function;
a modulation signal detector coupled to the non-linear circuit to output a likelihood signal based on the shaped frequency signal; and
a demodulator coupled to the non-linear circuit to demodulate the shaped frequency signal into a demodulated signal based at least in part on the likelihood signal;
a signal processor coupled to the receiver to process the demodulated signal to obtain message content; and
a digital processor coupled to the signal processor to process the message content.

19. The system of claim 18, wherein the non-linear circuit is to generate the shaped frequency signal according to the non-linear transfer function comprising at least one of a sine approximation function or a cosine approximation function.

20. The system of claim 18, wherein the non-linear circuit is to:
when the frequency signal is within a range, output the frequency signal as the shaped frequency signal; and
when the frequency signal exceeds the range, reduce the frequency signal proportionally to an amount of exceeding the range and output the reduced frequency signal as the shaped frequency signal.

* * * * *